United States Patent [19]

Tanaka et al.

[11] Patent Number: 4,533,652

[45] Date of Patent: * Aug. 6, 1985

[54] AZO POLYMERIZATION INITIATOR COMPOSITION

[75] Inventors: Motoaki Tanaka, Urawa; Takanori Toyama, Kawagoe; Hitoshi Oba, Saitama; Osamu Yamaguchi, Sayama, all of Japan

[73] Assignee: Wako Pure Chemical Industries, Ltd., Osaka, Japan

[ * ] Notice: The portion of the term of this patent subsequent to Feb. 19, 2002 has been disclaimed.

[21] Appl. No.: 597,893

[22] Filed: Apr. 9, 1984

[30] Foreign Application Priority Data

Jul. 7, 1983 [JP] Japan ................................ 58-123861

[51] Int. Cl.$^3$ ........................... C08F 2/18; C08F 4/04; C08F 2/20; C08F 14.06
[52] U.S. Cl. .................................. 502/167; 502/150; 526/199; 526/200; 526/201; 526/202; 526/203; 526/344.2
[58] Field of Search .............................. 502/150, 167; 526/199-203, 344.2

[56] References Cited

U.S. PATENT DOCUMENTS

| | | | |
|---|---|---|---|
| 3,974,133 | 8/1976 | Evans | 526/345 |
| 4,002,812 | 1/1977 | Hendy | 526/342 |
| 4,011,388 | 3/1977 | Murphy et al. | 526/200 |
| 4,330,653 | 5/1982 | Klippert et al. | 526/344.2 |
| 4,391,962 | 7/1983 | Schrevrs et al. | 526/200 |
| 4,429,085 | 1/1984 | Henderson et al. | 526/92 |

FOREIGN PATENT DOCUMENTS 0077211  4/1983  European Pat. Off. ............ 502/150

*Primary Examiner*—P. E. Konopka
*Attorney, Agent, or Firm*—Armstrong, Nikaido, Marmelstein & Kubovcik

[57] ABSTRACT

An azo polymerization initiator composition obtained by kneading an azo compound, a dispersing agent and a surface active agent at a temperature of 20° C. or lower, while adjusting the water content of the composition to 0 to 50% by weight, has good storage stability for a long period of time and, at any time desired for polymerization, can give a uniform aqueous suspension of the azo compound for polymerization of unsaturated vinyl monomers with high polymerization initiator activity.

11 Claims, No Drawings

AZO POLYMERIZATION INITIATOR COMPOSITION

BACKGROUND OF THE INVENTION

This invention relates to an azo polymerization initiator composition and a process for producing the same.

Azo compounds are effective as polymerization initiators for unsaturated vinyl monomers and the like and are widely used. However, azo compounds are disadvantageous in that when stored, they agglomerate into a block during the storage and cannot be used as they are as polymerization initiators. On the other hand, in recent years, polymerization in a closed system has been aimed at, so that azo compounds have been used in the form of a solution in an organic solvent. However the employment of organic solvents involves problems, for example, in recovering the organic solvents after use, and is disadvantageous from the viewpoint of preservation of natural resources and safety and sanitation, and hence is not preferred.

Employment of azo polymerization initiators in the form of an aqueous suspension is preferred because it removes the defects of the above-mentioned method comprising the dissolution in organic solvents. However since azo compounds are insufficiently hydrophilic, the stability of the aqueous suspension becomes a problem when they are merely dispersed into water. In order to meet such a demand, the present inventors have proposed a process for producing an aqueous suspension containing substantially no organic solvent and containing an azo compound in the form of fine particles by dissolving an azo compound in an organic solvent, emulsifying the resulting solution by addition of water, a water-soluble polymer, a surface active agent and the like, and then allowing the organic solvent to evaporate (U.S. patent application Ser. No. 433,690 filed Oct. 12, 1982). According to this process, the aqueous suspension containing the azo compound contains no foam, and hence there can be produced an aqueous suspension which has excellent dispersing stability for a long period of time and permits usual pump transport.

However, this aqueous suspension contains the azo compound in an amount of usually 1 to 50% by weight, preferably 5 to 40% by weight, and water in an amount of usually about 3 to 20 times as much as the azo compound and hence is inconvenient, for example, in that it requires a large space for storage and high energy and much time for transport.

SUMMARY OF THE INVENTION

The objects of this invention are to provide an azo polymerization initiator composition having a low water content which can easily give a uniform and stable aqueous azo polymerization initiator suspension when used for polymerization and prevents the azo compound from agglomerating into a block during storage, and a process for producing the same.

This invention provides an azo polymerization initiator composition comprising an azo compound, a dispersing agent in an amount of 0.001 to 30% by weight based on the weight of the azo compound, and a surface active agent in an amount of 0.5 to 30% by weight based on the weight of the azo compound, said composition having a water content of 0 to 50% by weight.

This invention further provides a process for producing an azo polymerization initiator composition which comprises kneading an azo compound, a dispersing agent in an amount of 0.001 to 30% by weight based on the weight of the azo compound, and a surface active agent in an amount of 0.5 to 30% by weight based on the weight of the azo compound at a temperature of 20° C. or lower, while adjusting the water content of the composition to 0 to 50% by weight.

DESCRIPTION OF THE PREFERRED EMBODIMENTS

In this invention, the term "aqueous suspension" means a composition or a mixture having a water content of 50% by weight or more, the term "paste" means that having a water content of 5 to 50% by weight, and the term "low-water-content paste" means that having a water content of 0 to 5% by weight.

As the azo compound, there can be used symmetric or asymmetric organic azonitrile compounds conventionally used as well as other azo compounds conventionally used as azo polymerization initiators. Further, in this invention, as the azo compound, there may be used those which are solid at ordinary temperatures or lower. Examples of the azo compounds are 2,2'-azobisisobutyronitrile, 2,2'-azobis(2,4-dimethylvaleronitrile), 2,2'-azobis(2,3,3-trimethylvaleronitrile), 2,2'-azobis(2,4,4-trimethylvaleronitrile), 2,2'-azobis(2-cyclopropylpropionitrile), 1,1'-azobis(cyclohexane-1-carbonitrile), 2,2'-azobis(2,4-dimethyl-4-methoxyvaleronitrile), 2-t-butyl-azo-2,4,4-trimethylvaleronitrile, 2-α-naphthylazoisobutyronitrile, 2,2'-azobis(methyl isobutyrate), 2,2'-azobis(N,N'-dimethyleneisobutylamidine), etc.

The particle size of these azo compounds is not critical, and there may be used, if necessary, those in the form of fine particles or those in the form of coarse particles which have not undergone any step of fine grinding. The particle sizes of the azo compounds which have not undergone any step of fine grinding are, for example, about 150 μm on the average and about 450 μm at the maximum. The particle size of the fine particles is, for example, about 10 to about 50 μm. The fine particles are preferred because they can be dispersed into water very finely, uniformly and with stability. Further, since they are very rapidly soluble as polymerization initiators in oil drops of a polymerizable monomer, the time required for the polymerization step can greatly be reduced if necessary, so that the efficiency of production of a polymer is greatly improved, and moreover the resulting polymer is excellent in physical properties, workability and the like.

As the dispersing agent, high polymer materials are suitable, and examples thereof include synthetic high polymers such as carboxy vinyl polymers or their salts (preferably, alkali metal salts, ammonium salts or organic amine salts), polyethyleneimine, polyethylene oxide, polyvinyl alcohol, polyvinyl pyrrolidone and the like; cellulose derivatives such as methyl cellulose, carboxymethyl cellulose, hydroxyethyl cellulose, hydroxypropyl cellulose, hydroxypropylmethyl cellulose, cellulose acetate phthalate and the like; animal proteins such as animal glue, gelatin and the like; vegetable mucilages such as gum arabic, pectin, saponin and the like; materials derived from seaweeds such as alginic acid, carrageenin, and the like; starch; fabricated starch; etc.

Here, the term "carboxy vinyl polymers or their salts (alkali metal salts, ammonium salts or organic amine salts)" means straight-chain or crosslinking type acrylic polymers, methacrylic polymers or copolymers thereof, copolymers of an acrylic or methacrylic acid monomer and vinyl alcohol, or their salts (preferably, alkali metal salts such as Na salts and K salts, ammonium salts, or organic amine salts such as salts with dimethylamine, diethylamine, trimethylamine, triethylamine or the like).

These dispersing agents may be used alone or as a mixture thereof.

The dispersing agent is usually solid and is added in an amount of 0.001 to 30% by weight, preferably 0.01 to 15% by weight based on the weight of the azo compound. When it is used in an amount of more than 30% by weight, the viscosity of an aqueous suspension which is used for polymerization and is prepared from the azo polymerization initiator composition increases too much, so that there can be obtained no desirable fluidity which permits pump transport. When the amount used is less than 0.001% by weight, no stable aqueous suspension can be obtained.

As the surface active agent, there may be used nonionic, cationic or anionic ones. Among them, the nonionic surface active agents are preferred. Examples of preferable nonionic surface active agents include sorbitan monolaurate, sorbitan monooleate, sorbitan sesquioleate, glyceryl monostearate, polyoxyethylene nonyl phenyl ether, polyoxyethylene sorbitan monolaurate, etc. The surface active agent is added in an amount of 0.5 to 30% by weight, preferably 5 to 20% by weight based on the weight of the azo compound.

When the amount of the surface active agent is less than 0.5% by weight, the effect of preventing the azo compound from agglomerating into a block is lessened. As a result the tendency of the azo compound particles to secondary aggregation and agglomeration into a block increases, and when an aqueous suspension is prepared from the resulting composition, good dispersing stability cannot be obtained. On the other hand, when the amount of the surface active agent is more than 30% by weight, the effect of preventing the agglomeration into a block cannot be expected to be improved. In addition, when such a composition as having more than 30% by weight of surface active agent is made into an aqueous suspension, the resulting suspension has a very high viscosity, so that it becomes impossible to obtain good dispersing stability and desirable fluidity permitting pump transport and at the same time, it sometimes becomes impossible to conduct smooth polymerization. Such a large amount of surface active agent is not preferable also from the viewpoint of treatment of the waste solution after polymerization.

The composition of this invention has good storage stability for a long period of time and can give a uniform and stable aqueous suspension of the azo polymerization initiator at the site of use. When either the dispersing agent or the surface active agent is omitted in the composition, the desired object cannot be achieved.

The azo compound, the dispersing agent and the surface active agent are mixed and uniformly kneaded at a temperature of as low as 20° C. or lower.

For this kneading, conventional kneaders or mixers such as ribbon blenders, V-type mixers, kneaders and the like can be used without any trouble.

The reason why the temperature for the kneading is 20° C. or lower is that the azo compound becomes so active at higher temperatures that it is deteriorated, so that the kneading is conducted at a temperature equal to or lower than the melting point of the azo compound, preferably at 5° to 20° C. in order to prevent the deterioration.

In order to obtain the composition of the present application, it is necessary to adjust the water content of the composition to 0 to 50% by weight. This is because when the water content is too high, an increase in the volume due to the water is caused, so that the composition is useless for reduction of storage space and reduction of energy, time and the like for transport.

The composition of this invention may contain a small amount of an anti-foaming agent (e.g. Shin-etsu Silicone KM-72 or the like). When an anti-foaming agent is added, there is prevented formation of foams which inhibit the dispersing stability of an aqueous suspension prepared from said composition, and said composition becomes more effective for obtaining an aqueous suspension having good dispersing stability.

Further, the stabilities and other properties of the compound and an aqueous suspension obtained therefrom are not influenced undesirably at all by incorporation of a small amount of an organic solvent such as methanol, methylene chloride or the like.

The azo polymerization initiator composition of this invention has a volume during transport and storage about ⅓ to 1/20 as small as that of an aqueous suspension of the azo polymerization initiator, and therefore it can solve problems in transport and storage caused in the case of the aqueous suspension and is very easy to handle.

Even when transported or stored for a long period of time at a low temperature, preferably at a temperature of 20° C. or lower, the composition of this invention undergoes no change in physical properties, that is, it does not undergo, at all, agglomeration into a block, coloration, separation of the oil or water and change of the azo compound content. It is very surprising that although in general, azo compounds tend to agglomerate into a block, the composition of this invention undergoes no agglomeration into a block at all.

When the composition of this invention is used as polymerization initiator for unsaturated vinyl monomers or the like after transport or storage, it is usually used by dispersing the same into a volume of water 3 to 20 times as much as the volume of the composition with stirring. In this case, the composition is easily dispersed into water to give a uniform and stable aqueous suspension having a low viscosity and permitting easy transport in a liquid form which is used for the initiation of polymerization of unsaturated vinyl monomers.

These procedures are usually carried out at a temperature equal to or lower than the melting point of the azo compound, preferably at a low temperature suitable for completely preventing the azo compound from deterioration by its own activity (usually 5° to 20° C.).

The composition of this invention does not change in dispersibility in water even when stored for a long period of time, and can easily be dispersed into a suitable amount of water. And the resulting aqueous suspension is uniform and has good dispersing stability for a long period of time. Its dispersing stability is as excellent as that of an aqueous suspension obtained by direct dispersion of the azo compound not agglomerated into a block together with a dispersing agent, a surface active agent, etc., into water.

As a process for preparing an aqueous suspension of the azo compound in the form of fine particles, there is also a process in which the azo compound is previously finely ground by a jet mill method or the like and made into the composition of this invention, and there may also be employed a process which comprises preparing an aqueous suspension from a composition of the azo compound in the form of coarse particles, and then grinding the azo compound in the wet process by a ball mill method or the like. According to either of these processes, there can easily be obtained a uniform and stable aqueous suspension of the azo polymerization initiator.

Thus, the composition of this invention has good storage stability for a long period of time, and when used as a polymerization initiator for unsaturated vinyl monomers or the like, it can easily give a uniform and stable aqueous suspension of the azo compound, so that the aqueous suspension can easily be prepared at the time of polymerization.

This invention is explained below referring to Examples.

EXAMPLE 1

By use of a jet mill (Model 200AS manufactured by Fuji Sangyo Co., Ltd., pneumatic pressure for charging powder: 6 kg/cm$^2$, pneumatic pressure for grinding: 4 kg/cm$^2$, and amount of air 7 m$^3$/min), 2,2'-azobis(2,4-dimethylvaleronitrile) finely ground to an average particle size of 20 μm or less was previously prepared.

Into a universal type kneader (Model 5DM-r manufactured by San-ei Seisakusho, Ltd., revolution: 126 r.p.m. and rotation: 288 r.p.m.) was charged 1 kg of the aforesaid azo compound, after which a dispersion of 1.5 g of ammonium salt of carboxy vinyl polymer (HIVISWAKO® 105, a trade name, mfd. by Wako Pure Chemical Industries, Ltd.) in 100 g of sorbitan monolaurate and a mixture of 5 ml of Silicone KM-72 (a tradename, manufactured by Shin-etsu Chemical Industry Co., Ltd.) and 50 g of sorbitan monolaurate were dropped into the universal type kneader with cooling to 20° C. or lower and with stirring, and the resulting mixture was kneaded to obtain about 1.15 kg of a uniform composition (low-water-content paste).

The composition obtained was placed in a polyethylene bag, which was then sealed up within a stainless steel vessel and stored under a temperature condition of 20° C. or lower for 6 months. During the storage, the composition did not undergo agglomeration into a block, separation of oil and coloration at all.

When the composition after the storage for 6 months was dissolved in methanol and the absorbance at 348 nm of the resulting solution was measured, the 2,2'-azobis(2,4-dimethylvaleronitrile) content had hardly been changed as compared with the amount charged.

Further, when 46 g of the composition after the storage for 6 months was dispersed into 154 ml of water with conventional stirring at a temperature of 20° C. or lower, it was easily dispersed to give a uniform cream-like aqueous suspension containing about 20% of 2,2'-azobis(2,4-dimethylvaleronitrile) and having a viscosity of 580 cps (by a Brookfield viscometer). This aqueous suspension had good dispersing stability. When this aqueous suspension was used for polymerization of vinyl chloride, the polymerization was carried out smoothly.

EXAMPLE 2

By using the same universal type kneader Model 5DM-r as in Example 1, 1 kg of 2,2'-azobisisobutyronitrile previously finely ground to an average particle size of 20 μm or less by a jet mill Model 200AS as in Example 1 was kneaded together with 200 g of sorbitan monolaurate and 1 g of Na salt of carboxy vinyl polymer (HIVISWAKO® 103, a trade name) to obtain about 1.2 kg of a uniform composition (low-water-content paste).

When stored for 6 months under the same conditions as in Example 1, the composition did not undergo agglomeration into a block, separation of oil and coloration at all. Further, when this composition stored was dissolved in methanol and the absorbance at 347 nm of the resulting solution was measured, it was found that a change in the 2,2'-azobisisobutyronitrile content or the like had not been caused at all.

Further, when 180 g of this composition stored for 6 months was dispersed into 420 ml of water with conventional stirring at a temperature of 20° C. or lower, it was easily dispersed to give a uniform cream-like aqueous suspension containing about 25% of 2,2'-azobisisobutyronitrile and having a viscosity of 620 cps. The aqueous solution had good dispersing stability and polymerization-initiating effect.

EXAMPLE 3

Into a universal type kneader Model 5DM-r was charged 1 kg of 2,2'-azobis(2,4-dimethylvaleronitrile), after which a dispersion of 1 kg of ammonium salt of carboxy vinyl polymer (HIVISWAKO® 105, a trade name) in 100 g of sorbitan trioleate was dropped thereinto with stirring and with cooling to 20° C. or lower, and the resulting mixture was kneaded to obtain about 1.1 kg of a composition (low-water-content paste). The kneading was repeated 5 times under the same conditions to produce about 5.5 kg in total of a uniform composition, which was then stored for 3 months under the same conditions as in Example 1.

The composition after the 3 months' storage had not undergone at all agglomeration into a block, separation of oil, coloration and change in the content. When about 5.5 kg of this composition stored for 3 months was dispersed into about 22.3 liters of water with conventional stirring at a temperature of 20° C. or lower, it was easily dispersed to give a uniform cream-like aqueous suspension containing about 18% of 2,2'-azobis(2,4-dimethylvaleronitrile) and having an average particle size of 150 μm and a viscosity of 420 cps.

When the suspension was ground in the wet process by means of attritor Model MQ-1 (Mitsui Miike Machinery Co., Ltd., grinding rotation rate: 300 r.p.m., and suspension pumping pressure: 1 kg/cm$^2$), there was obtained a uniform cream-like aqueous suspension having an average particle size of 20 μm or less and a viscosity of 880 cps. This suspension had good dispersing stability and polymerization-initiating effect.

EXAMPLE 4

To 670 ml of distilled water was added 0.7 g of ammonium salt of carboxy vinyl polymer (HIVISWAKO® 104, a trade name, mfd. by Wako Pure Chemical Industries, Ltd.) with stirring, and the resulting mixture was stirred for about 30 minutes to obtain a uniform viscous liquid. Thereafter, 67 g of sorbitan monopalmitate and 33 g of Shin-etsu Silicone KM-72 (a trade name, mfd. by Shin-etsu Chemical Industry Co., Ltd.) were added, and the resulting mixture was stirred to prepare a uniform aqueous solution of the dispersing agent.

Next, 1 kg of 2,2'-azobisisobutyronitrile previously ground to a particle size of about 30 to 50 μm by means of a JIYU MILL (Model M-2 manufactured by Nara Grinding Machinery Works, Ltd.) while sending thereinto cold air was charged into a universal type kneader Model 5DM-r (manufactured by San-ei Seisakusho, Ltd., revolution: 126 r.p.m., rotation: 288 r.p.m.), and 770 g of the aqueous dispersing agent solution previously prepared was added thereto dropwise over a period of 40 minutes with stirring and with cooling to 20° C. or lower. Thereafter, the resulting mixture was successively stirred and mixed for 30 minutes to obtain about 1.77 kg of a uniform paste-like composition. When the paste-like composition obtained was stored for 6 months under the same conditions as in Example 1, it underwent none of phenomena such as agglomeration into a block, separation of water, coloration and the like at all.

When the paste was dissolved in methanol and the absorbance at 347 nm of the resulting solution was measured, the 2,2'-azobisisobutyronitrile content had not been changed.

Further, when 150 g of this paste stored for 6 months was dispersed into 141 ml of distilled water with stirring at a temperature of 20° C. or lower, it was easily dispersed to give a uniform cream-like aqueous suspension containing about 30% of 2,2'-azobisisobutyronitrile and having a viscosity of 480 cps (by a Brookfield viscometer). The suspension had good dispersing stability and polymerization-initiating effect.

EXAMPLE 5

Into a kneader Model FM-NW-50 (mfd. by Fuji Sangyo Co., Ltd.) was charged 12 kg of 2,2'-azobisisobutyronitrile, and a dispersion of 1.6 g of ammonium salt of carboxy vinyl polymer (HIVISWAKO ® 104, a trade name, mfd. by Wako Pure Chemical Industries, Ltd.) in 1 kg of sorbitan monooleate was gradually dropped thereinto with stirring and with cooling to 20° C. or lower, followed by dropping thereinto a mixture of 120 g of Shin-etsu Silicone KM-73 (Shin-etsu Chemical Industry Co., Ltd.) and 200 g of sorbitan monooleate. Thereafter, the resulting mixture was stirred and mixed for 1 hour to obtain about 13.3 kg of a uniform composition.

When the composition obtained was stored for 6 months under the same conditions as in Example 1, it did not undergo agglomeration into a block, separation of oil, and coloration at all.

When this composition stored for 6 months was dissolved in methanol and the absorbance at 347 nm of the resulting solution was measured, it was also found from this measurement that the 2,2'-azobisisobutyronitrile content had not been changed.

Further, when 111 g of this composition was dispersed into 222 ml of water with conventional stirring at a temperature of 20° C. or lower, it was easily dispersed to give a uniform cream-like aqueous suspension containing about 30% of 2,2'-azobisisobutyronitrile and having a viscosity of 520 cps (by a Brookfield viscometer). The suspension had good dispersing stability and polymerization-initiating effect.

EXAMPLE 6

To 10 liters of distilled water was added 10 g of Na salt of carboxy vinyl polymer (HIVISWAKO ® 105, a trade name, mfd. by Wako Pure Chemical Industries, Ltd.) with stirring, and the resulting mixture was stirred for about 30 minutes to obtain a uniform viscous liquid. Thereafter, 1.5 g of sorbitan monostearate and 150 g of Shin-etsu Silicone KM-73 (Shin-etsu Chemical Industry Co., Ltd.) were added, and the resulting mixture was stirred to prepare a uniform aqueous solution of the dispersing agent.

Next, 10 kg of 2,2'-azobis(2,4-dimethylvaleronitrile) previously ground to a particle size of about 30 μm by means of a JIYU MILL (Model M-2 manufactured by Nara Grinding Machinery Works, Ltd.) while sending thereinto cold air was charged into a kneader Model FM-NW-50 (mfd. by Fuji Sangyo Co., Ltd.), and 11.66 kg of the aqueous dispersing agent solution previously prepared was added thereto dropwise over a period of about 1 hour with stirring and with cooling to 20° C. or lower. Thereafter, the resulting mixture was stirred and mixed for about 1 hour to obtain 21.6 kg of a paste. When the paste was stored for 6 months under the same conditions as in Example 1, it underwent none of phenomena such as agglomeration into a block, separation of water and coloration and no change in the 2,2'-azobis(2,4-dimethylvaleronitrile) content.

Further, when 219 g of this paste stored for 6 months was dispersed into 114 ml of distilled water with stirring at a temperature of 20° C. or lower, it was easily dispersed to give a uniform cream-like aqueous suspension containing about 30% of 2,2'-azobis(2,4-dimethylvaleronitrile) and having a viscosity of 565 cps (by a Brookfield viscometer). The suspension had good dispersing stability and polymerization-initiating effect.

What is claimed is:

1. An azo polymerization initiator composition comprising an azo polymerization initiator compound, a dispersing agent in an amount of 0.001 to 30% by weight based on the weight of the azo polymerization initiator compound, and a surface active agent in an amount of 0.5% to 30% by weight based on the weight of the azo polymerization initiator compound, wherein said dispersing agent is selected from the group consisting of a synthetic high polymer, a cellulose derivative, an animal protein, a vegetable mucilage, a material derived from seaweeds, starch or fabricated starch, and said surface active agent is selected from the group consisting of cationic, anionic, and non-ionic surface active agents, said composition having a water content of 0 to 50% by weight.

2. A composition according to claim 1, wherein the synthetic high polymer is polyethyleneimine, poly(ethylene oxide), poly(vinyl alcohol), poly(vinyl pyrrolidone), polyacrylamide or a salt of these polymers.

3. A composition according to claim 1, wherein the synthetic high polymer is a carboxy vinyl polymer or a salt thereof.

4. A composition according to claim 1, wherein the surface active agent is a nonionic surface active agent.

5. A composition according to claim 1, wherein the azo polymerization initiator compound is at least one member selected from the group consisting of 2,2'-azobisisobutyronitrile, 2,2'-azobis(2,4-dimethylvaleronitrile), 2,2'-azobis(2,3,3-trimethylvaleronitrile), 2,2'-azobis(2,4,4-trimethylvaleronitrile), 2,2'-azobis(2-cyclopropylpropionitrile), 1,1'-azobis(cyclohexane-1-carbonitrile), 2,2'-azobis(2,4-dimethyl-4-methoxyvaleronitrile), 2-t-butyl-azo-2,4,4trimethylvaleronitrile, 2-α-naphthylazoisobutyronitrile, 2,2'-azobis(methyl isobutyrate), and 2,2'-azobis(N,N'-dimethyleneisobutylamidine)

6. A composition according to claim 1, wherein the water content is 5 to 50% by weight.

7. A composition according to claim 1, wherein the water content is 0 to 5% by weight.

8. An azo polymerization initiator composition obtained by kneading an azo polymerization initiator compound, a dispersing agent in an amount of 0.001 to 30% by weight based on the weight of the azo polymerization initiator compound, and a surface active agent in an amount of 0.5 to 30% by weight based on the weight of the azo polymerization initiator compound at a temperature of 20° C. or lower, while adjusting the water content of the composition to 0 to 50% by weight, wherein said dispersing agent is selected from the group consisting of a synthetic high polymer, a cellulose derivative, an animal protein, a vegetable mucilage, a material derived from seaweeds, starch or fabricated starch, and said surface active agent is selected from the group consisting of cationic, anionic, and non-ionic surface active agents.

9. A process for producing an azo polymerziation initiator composition which comprises kneading an azo polymerization initiator compound, a dispersing agent in an amount of 0.001 to 30% by weight based on the weight of the azo polymerization initiator compound, and a surface active agent in an amount of 0.5 to 30% by weight based on the weight of the azo polymerization initiator compound at a temperature of 20° C. or lower, while adjusting the water content of the composition to 0 to 50% by weight, wherein said dispersing agent is selected from the group consisting of a synthetic high polymer, a cellulose derivative, an animal protein, a vegetable mucilage, a material derived from seaweeds, starch or fabricated starch, and said surface active agent is selected from the group consisting of cationic, anionic, and non-ionic surface active agents.

10. A process according to claim 9, wherein the water content is 5 to 50% by weight.

11. A process according to claim 9, wherein the water content is 0 to 5% by weight.

* * * * *